April 27, 1965 F. C. GALLEY 3,180,356
COMBINATION PRESSURE REGULATOR AND SHUT-OFF VALVE
Filed Jan. 7, 1963
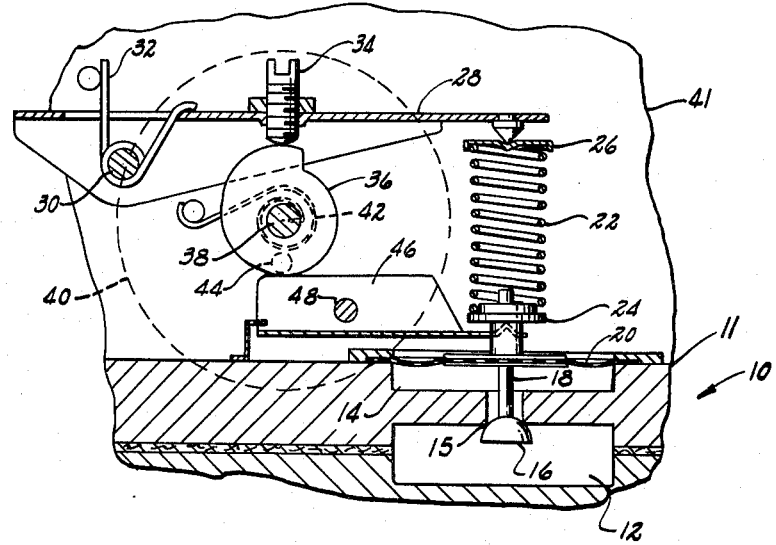
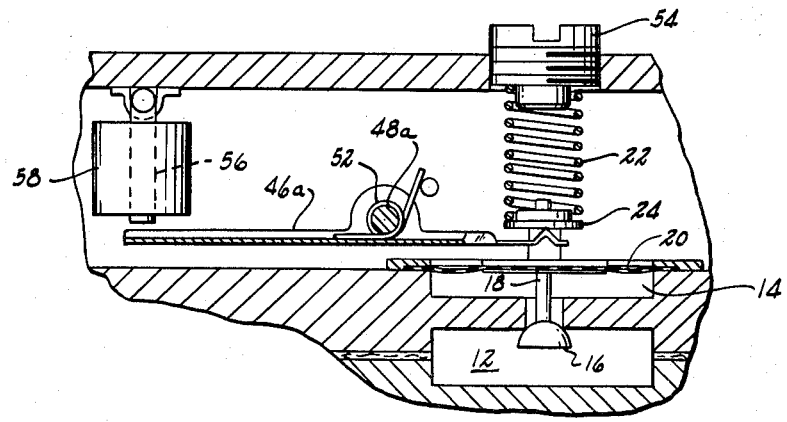
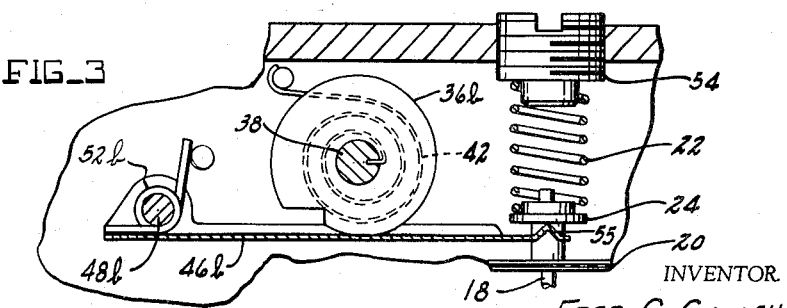
INVENTOR.
FRED C. GALLEY
BY
Andrew K. Jones
*His* ATTORNEY

United States Patent Office 3,180,356
Patented Apr. 27, 1965

3,180,356
COMBINATION PRESSURE REGULATOR
AND SHUT-OFF VALVE
Fred C. Galley, Detroit, Mich., assignor to American
Radiator & Standard Sanitary Corporation, New York,
N.Y., a corporation of Delaware
Filed Jan. 7, 1963, Ser. No. 249,820
3 Claims. (Cl. 137—495)

This invention relates to fluid pressure regulators, as for example fuel gas regulators for gaseous fuel burners.

One object of the invention is to improve an otherwise conventional pressure regulator by incorporating a shut-off mechanism therein.

A further object is to provide a combination pressure regulator-gas shut-off valve wherein the valve element can be caused to initially move from a closed position to a partially open low flame position and after ignition to a completely open full flame position. Such operation prevents the outrush and accumulation of substantial unburned fuel qauntities, and thereby in some instances improves the burner performance during the start-up period.

Other objects of this invention will appear from the following description and appended claims, reference being had to the accompanying drawings forming a part of this specification wherein like reference characters designate corresponding parts in the several views.

In the drawings:

FIGURE 1 is a sectional view taken through a device having features of the invention incorporated therein;

FIG. 2 is a sectional view taken through a second device having features of the invention incorporated therein;

FIG. 3 is a sectional view of the third device having features of the invention incorporated therein.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring in greater detail to the drawings, particularly FIG. 1, there is shown a gaseous fuel supply unit 10 having a pressure regulator 11 which controls the pressure in a pilot stream leading to the main regulating diaphragm of the supply unit, all as better shown in U.S. Patent 2,980,133. If desired regulator 11 could be utilized to directly control a main gas stream in the manner shown in U.S. Patent 2,982,300.

As shown in FIG. 1 of the instant drawings, the regulator is provided with an inlet chamber 12, an outlet chamber 14, and a valve seat 15. To control and regulate the flow through the seat there is provided a flow-throttling element 16 having a stem 18 which is suitably connected with a pressure-responsive diaphragm 20 and compression spring 22. The lower end of the spring engages a spring seat member 24 carried on stem 18, and the upper end of spring 22 engages a spring seat member 26 located on a force applying lever 28. During normal operation of the gas burner diaphragm 20 responds to increasing outlet pressure to move element 16 toward seat 15, and spring 22 responds to deceasing outlet pressure to move element 16 away from seat 15. The result therefore is a substantially stabilized or regulated outlet pressure.

As shown in FIG. 1, lever 28 is fulcrumed on a shaft 30, around which is trained a heavy hairpin spring 32 which exerts a clockwise biasing force on the lever. The central portion of the lever carries a set screw 34 which rides on a rotary control cam 36 carried on a shaft 38. A small synchronous electric motor 40 (mounted on the exterior face of housing wall 41) is arranged to rotate shaft 38 in a clockwise direction to allow spring 32 to continually maintain portion 34 of lever 28 against the cam surface. Rotation of cam 36 in the clockwise direction winds up a clock-type spring 42; therefore when the motor is de-energized spring 42 is effective to rapidly rotate the cam counterclockwise to its illustrated position.

During the motor-energization period the cam is rotated clockwise less than a full revolution, after which the motor stalls and maintains the cam motionless until the motor is de-energized. In a domestic space heater arrangement the motor would be energized by a call for heat from the room thermostat and would be de-energized by satisfaction of the room thermostat. The clockwise cam movement preferably takes place in a time interval which in an absolute sense is relatively short, as for example ten or twenty seconds. The counterclockwise cam movement preferably and necessarily takes place in a considerably shorter time interval, for example one second or thereabouts.

Cam 36 carries an axial cam-forming projection 44 which, in the illustrated position, is engaged with a force applying channel-shaped lever 46 fulcrumed on a shaft 48. The right end of the lever is forked so as to underlie the spring seat member 24 in a manner to oppose the action of spring 22 and normally hold elements 16 against valve seat 15.

In its illustrated position lever 46 holds element 16 in a position completely blocking flow into outlet chamber 14. However, as cam 36 is rotated clockwise by motor 40 projection 44 rides off of lever 46 so that the lever no longer acts as an abutment opposing downward movement of spring seat 24. Spring 22 is therefore able to move element 16 to a partially open low flame position. Lever 28 initially exerts a relatively small loading force on spring 22; therefore during the initial stages of cam rotation spring 22 moves the valve elements only to the partially open low flame position. As the cam continues its clockwise rotation lever 28 is forced downwardly by heavy spring 32 so as to increase the loading on spring 22. Spring 22 is therefore able to apply an increasing force on the flow-throttling element 16 until the cam has rotated about one hundred eighty radial degrees. The motor can then run past the one-half revolution mark without further increasing the loading on spring 22. In the fully lowered position of lever 28 the spring 22 is sufficiently loaded to establish and maintain a regulated full flow of gas to the burner. Such flow is maintained until the motor is de-energized.

It will be seen that lever 28 constitutes a load-adjustment means for spring 22, and that the contour of cam 36 determines the manner in which the load is varied, particularly during the start-up period. The manufactured contour of cam 36 can of course be chosen to give different graduated valve-opening characteristics, as for example a relatively quick movement to the low flame position followed by a relatively slow movement to the full flame position, or a gradual continuous movement from the off position to the full flame position. Adjustment of screw 34 is for calibration purposes, i.e., for correcting for slight tolerance variations in the shaft, stem, valve element, spring, etc.

From the above it will be seen that the FIG. 1 device incorporates a pressure regulator and a shut-off in a unitary construction. The regulator spring 22 is arranged to apply a graduated force on the flow-throttling element to provide a safe-lighting mode of operation.

Referring to FIG. 2, there is shown an arrangement wherein the flow-throttling element 16 is normally retained in the closed position by means of heavy spring 52 and lever 46a. The left end portion of the lever constitutes an armature for cooperation with the U-shaped core 56 of a solenoid 58, the arrangement being such that when the solenoid is energized lever 46a is moved clockwise about shaft 48a. Lever 46a is thus disconnected from spring seat member 24 so that spring 22 is operative on the flow-throttling element 16 for pressure-regulating purposes. When the solenoid is de-energized, for example by satisfaction of a room thermostat, spring 52 moves lever 46a counterclockwise to its illustrated position wherein the flow throttling element is closed. During the valve-open period of operation the value of the regulated pressure is determined by the setting of adjustable seat member 54.

The FIG. 2 arrangement incorporates the combined regulating and shut-off action of the FIG. 1 arrangement, but does not include the graduated opening feature which is present in the FIG. 1 construction. One noteworthy feature of the FIG. 2 arrangement is the use of a lever 46a which disposes the solenoid out of alignment with spring 22. The pressure calibration member 54 is easily accessible and spring 22 is not required to extend within the interior of the solenoid, as for example in the manner shown at 86 in aforementioned Patent 2,982,300. The solenoid can thus be smaller while having the same number of turns and using less wire, all to the end of manufacturing economy.

The FIG. 3 embodiment is in some respects similar to the FIG. 1 and FIG. 2 embodiments, and similar reference numerals are utilized where applicable. In the FIG. 3 embodiment there is utilized an electric motor having a driven shaft 38 which carries the cam 36b. A suitable spring 42 is arranged to rotate the cam counterclockwise when the motor is de-energized. Cooperating with the cam is a force applying lever 46b which is continually urged against the cam by a heavy spring 52b.

In operation of the FIG. 3 embodiment, energization of the motor causes cam 36b to rotate clockwise so that lever 46b moves clockwise about its mounting shaft 48b in a controlled manner. Spring 22 thus is able to initially force the throttling element 16 to a partially opened low-flame position before cam 36b has completed its designated clockwise travel. During the latter stage of the clockwise cam travel the forked portion 55 of lever 46b leaves the spring seat member 24 so that spring 22 is able (in conjunction with diaphragm 20) to provide a regulated full-flame pressure in outlet chamber 14. As with the FIG. 1 embodiment, when the room thermostat de-energizes the electric motor, spring 42 rapidly reverses cam 36b to cause the lever 46b to close the flow-throttling element 16.

The invention has been illustrated in three embodiments, but it will be appreciated that some variations from the illustrated forms may be resorted to while still practicing the invention as defined in the appended claims.

I claim:
1. In a pressure regulator having an inlet, an outlet, and a valve seat therebetween; a flow-throttling element movable toward and away from said seat to regulate flow therethrough; fluid pressure-responsive means operatively connected with said flow-throttling element for moving same toward said seat in response to increasing outlet pressure; and spring means operatively connected with said flow-throttling element for moving same away from said seat in response to decreasing outlet pressure: the improvement comprising lever means normally applying a pressure on the flow-throttling element to maintain same closed against the seat; and electrically-controlled power means operable to effect a graduated reduction in the pressure which is applied from said lever means to the flow-throttling element.

2. The combination of claim 1 wherein the electrically-controlled power means comprises a motor-driven cam arranged to impart a controlled motion to the lever means.

3. In a pressure regulator having an inlet, an outlet, and a valve seat therebetween; a flow-throttling element movable toward and away from said seat to regulate flow therethrough; fluid pressure-responsive means operatively connected with said flow-throttling element for moving same toward said seat in response to increasing outlet pressure; and spring means operatively connected with said flow-throttling element for moving same away from the valve seat in response to decreasing outlet pressure: the improvement comprising electrically-controlled power mechanism operable in one condition thereof to cause the throttling element to be closed against the seat, and operable in a second condition thereof to provide a controlled graduated movement of the flow-throttling element away from the valve seat until the throttling element is under the joint influence of the spring means and pressure-responsive means; said power mechanism comprising lever means having a disengageable connection with the flow-throttling element, and a motor-driven cam operating on said lever means.

References Cited by the Examiner
UNITED STATES PATENTS

| 2,134,257 | 10/38 | Leutwiler et al. | 137—495 |
| 2,247,060 | 6/41 | Levine et al. | 236—92 |
| 2,891,784 | 6/59 | Taylor | 137—116.5 XR |
| 2,982,300 | 5/61 | Jackson et al. | 137—495 |
| 2,987,309 | 6/61 | Biggle | 137—495 XR |
| 3,006,362 | 10/61 | Spence | 137—505.14 XR |

FOREIGN PATENTS 750,620    6/56    Great Britain.

M. CARY NELSON, *Primary Examiner.*

MARTIN P. SCHWADRON, *Examiner.*